US012318919B2

(12) United States Patent
Inoue et al.

(10) Patent No.: US 12,318,919 B2
(45) Date of Patent: Jun. 3, 2025

(54) ARM STRUCTURE OF INDUSTRIAL ROBOT

(71) Applicant: FANUC CORPORATION, Yamanashi (JP)

(72) Inventors: Toshihiko Inoue, Yamanashi (JP); Akihiro Oikawa, Yamanashi (JP); Rion Miyashita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/004,586

(22) PCT Filed: Jul. 14, 2021

(86) PCT No.: PCT/JP2021/026469
§ 371 (c)(1),
(2) Date: Jan. 6, 2023

(87) PCT Pub. No.: WO2022/019194
PCT Pub. Date: Jan. 27, 2022

(65) Prior Publication Data
US 2023/0249364 A1    Aug. 10, 2023

(30) Foreign Application Priority Data
Jul. 21, 2020   (JP) .................. 2020-124535

(51) Int. Cl.
*B25J 17/02*   (2006.01)
*B25J 9/10*    (2006.01)
*B25J 9/12*    (2006.01)

(52) U.S. Cl.
CPC ............... *B25J 17/02* (2013.01); *B25J 9/102* (2013.01); *B25J 9/108* (2013.01); *B25J 9/12* (2013.01)

(58) Field of Classification Search
CPC ..... B25J 9/102; B25J 9/108; B25J 9/12; B25J 17/02
See application file for complete search history.

(56) References Cited

U.S. PATENT DOCUMENTS 7,370,549 B2 *   5/2008   Haga ............... F16H 57/033
                                                 74/421 A
2008/0034920 A1 *   2/2008   Inoue .................. B25J 9/104
                                                 901/29

FOREIGN PATENT DOCUMENTS

CN          201155538 Y     11/2008
JP          2008-044019 A    2/2008
            (Continued)

OTHER PUBLICATIONS

International Search Report issued in PCT/JP2021/026469; mailed Oct. 12, 2021.

*Primary Examiner* — William C Joyce
(74) *Attorney, Agent, or Firm* — Studebaker Brackett PLLC (57) ABSTRACT

Provided is an arm structure of an industrial robot in which the same wrist element is enabled to have a plurality of types of characteristics, thus allowing a variation model to be readily implemented. An arm structure of an industrial robot with a plurality of wrist elements, the arm structure being provided with, in a housing: a first motor and a second motor that drive the plurality of wrist elements respectively; a first gear that is attached to a first output shaft of the first motor and has an external diameter equal to that of the first output shaft; and a second gear that is attached to a second output shaft of the second motor and has an external diameter equal to that of the second output shaft. The second motor is disposed in front of the first motor and is disposed such that the axis of the second output shaft is laterally offset with respect to the axis of the first output shaft. A space portion (Continued)

is provided to the rear of each of the first motor and the second motor.

2 Claims, 6 Drawing Sheets

(56) References Cited

FOREIGN PATENT DOCUMENTS

| | | |
|---|---|---|
| JP | 2009-000770 A | 1/2009 |
| JP | 2014-237206 A | 12/2014 |
| JP | 2017-185574 A | 10/2017 |

\* cited by examiner

FIG. 5

ARM STRUCTURE OF INDUSTRIAL ROBOT

TECHNICAL FIELD

The present invention relates to an arm structure of an industrial robot.

BACKGROUND ART

Conventionally, industrial robots are known that are provided with a plurality of wrist elements at a tip of an arm (for example, see Patent Document 1). In such industrial robots, variation models with different characteristics, such as a standard type and a heavy payload type with a large payload capacity may be lined up by modularization of the arm.
Patent Document 1: Japanese Unexamined Patent Application, Publication No. 2017-185574

DISCLOSURE OF THE INVENTION

Problems to be Solved by the Invention

For example, when the industrial robot is changed from a standard type to a variation model having characteristics of a heavy payload type, it is necessary to change a reduction ratio of a drive unit of the wrist element in order to increase the payload capacity of the wrist element. However, in order to change the reduction ratio, it is necessary to change the size and number of gears configuring a reducer of the drive unit. Therefore, it is necessary to prepare a wrist element with a new drive unit corresponding to the reduction ratio.

Therefore, in the industrial robot provided with the plurality of wrist elements, it is desirable to easily realize variation models by allowing the same wrist element to have a plurality of types of characteristics.

Means for Solving the Problems

An aspect of the disclosure provides an arm structure of an industrial robot including a plurality of wrist elements, including a first motor and a second motor that drive the plurality of wrist elements, respectively, within a housing; a first gear that is mounted on a first output shaft of the first motor; and a second gear that is mounted on a second output shaft of the second motor, in which the second motor is disposed forward from the first motor, and is disposed such that an axial line of the second output shaft is laterally offset with respect to an axial line of the first output shaft, and spaces are provided behind the first motor and the second motor, respectively.

Effects of the Invention

According to the aspect of the disclosure, it is possible to provide an arm structure of an industrial robot that can have a plurality of types of characteristics with the same wrist element and can easily realize variation models.

PREFERRED MODE FOR CARRYING OUT THE INVENTION

Figure 1A:
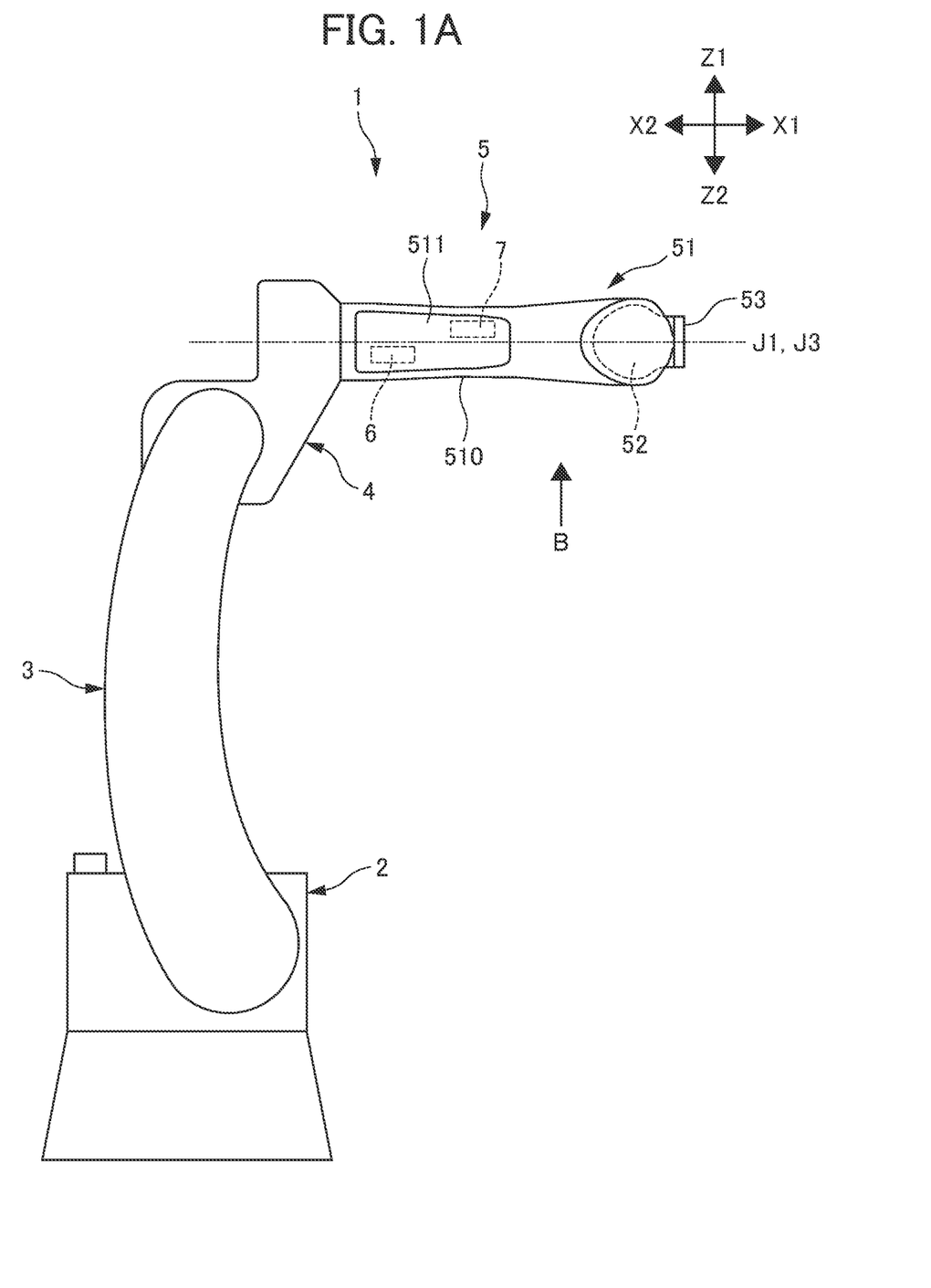
FIG. 1A is a side view of an industrial robot according to an embodiment.
Figure 1B:
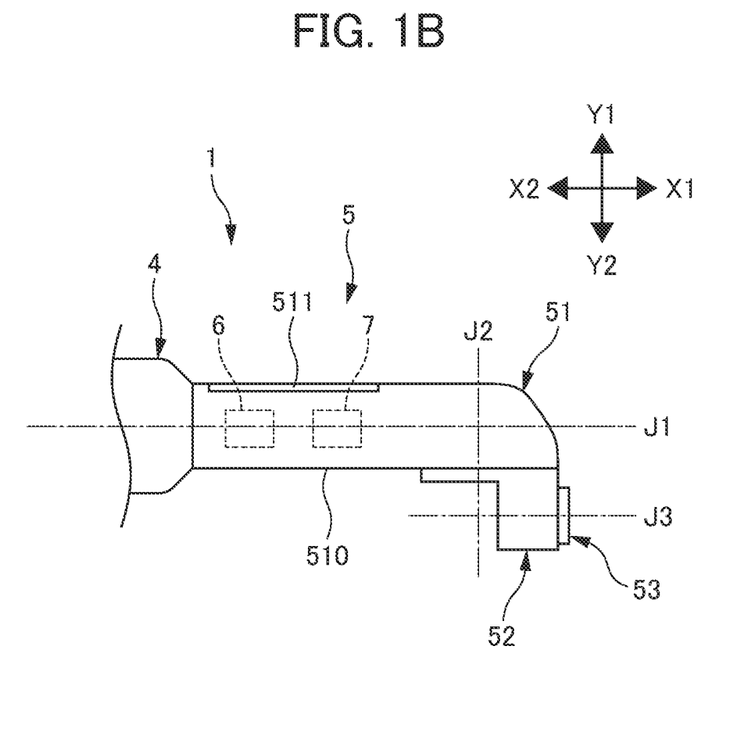
FIG. 1B is a view when a wrist portion of the industrial robot shown in FIG. 1A is viewed in a direction B in the drawing.

An arm structure of an industrial robot according to an aspect of the present disclosure will be described below with reference to the drawings. As shown in FIGS. 1A and 1B, an industrial robot 1 according to the present embodiment includes an upper arm 3 rotatably supported on a base stand 2, a forearm 4 rotatably supported on an upper end of the upper arm 3, and a wrist portion 5 rotatably supported on a front end of the forearm 4.

The industrial robot 1 three-dimensionally changes to various postures when each rotating portion rotates. However, for the sake of convenience, directions of the industrial robot 1 shown in each drawing are defined herein that a direction X1 is a "front side", a direction X2 is a "rear side", a direction Y1 is an "upper side", a direction Y2 is a "lower side", and directions Z1 and Z2 are "lateral sides".

The wrist portion 5 corresponds to the arm structure of the industrial robot 1. The wrist portion 5 is configured by a first wrist element 51, a second wrist element 52, and a third wrist element 53.

The first wrist element 51 elongates from the front end of the forearm 4 in the direction X1 in FIGS. 1A and 1B. The first wrist element 51 is supported on the front end of the forearm 4 so as to be rotatable around a first axial line J1 extending in a longitudinal direction of the first wrist element 51.

The second wrist element 52 is provided so as to protrude from a front end of the first wrist element 51 in the direction Y2 in FIG. 1B. The second wrist element 52 is supported on the front end of the first wrist element 51 so as to be rotatable around a second axial line J2 intersecting the first axial line J1.

The third wrist element 53 is provided so as to protrude from a front end of the second wrist element 52 in the direction X1 in FIGS. 1A and 1B. The third wrist element 53 is supported on the front end of the second wrist element 52 so as to be rotatable around a third axial line J3 intersecting second axial line J2. In the present embodiment, the third axial line J3 is disposed in parallel with the first axial line J1.

A configuration of the wrist portion 5 will be described in more detail. The first wrist element 51 of the wrist portion 5 extends forward from the front end of the forearm 4. A rear end of the first wrist element 51 is rotatably supported on the front end of the forearm 4. In the forearm 4, a motor and a reducer (neither of which are shown) are provided to reduce a rotating speed of the first wrist element 51 at a predetermined reduction ratio. The first wrist element 51 is driven by the motor to rotate around the first axial line J1 via the reducer.

Figure 2:
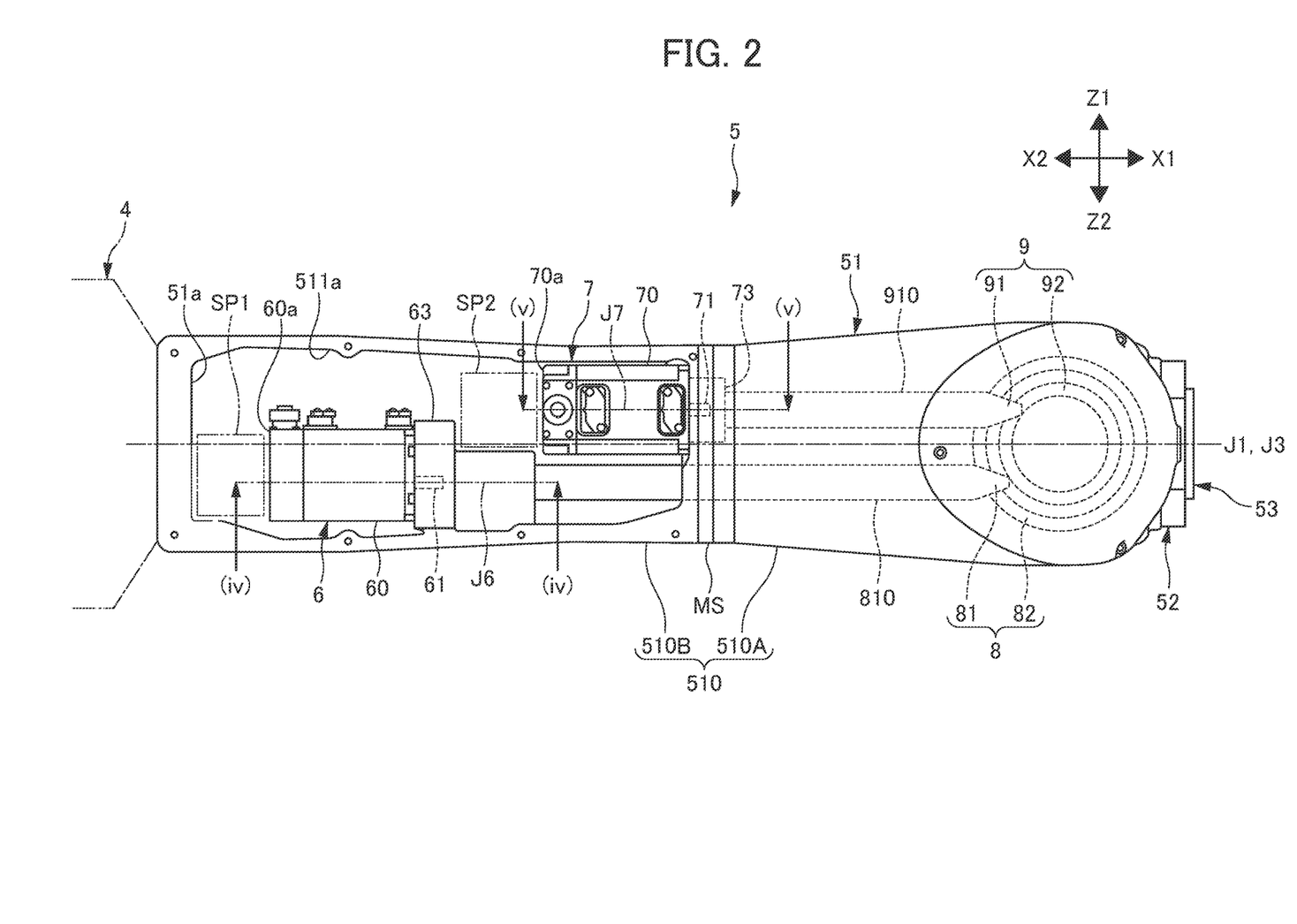
FIG. 2 is a plan view showing an arm structure of the industrial robot.

The first wrist element 51 includes a housing 510 configured by a front casing 510A and a rear casing 510B. The front casing 510A and the rear casing 510B are integrally fastened via a mating surface MS vertical to the first axial line J1. A lid 511 is detachably provided on an upper surface of the rear casing 510B to access an inside of the rear casing 510B. As shown in FIG. 2, an opening 511a is formed in the rear casing 510B, from which the lid 511 is detached, to greatly open the inside of the rear casing 510B.

The rear casing 510B houses therein a first motor 6 that drives the second wrist element 52 and a second motor 7 that drives the third wrist element 53. The first motor 6 and the second motor 7 are driven according to a command sent from a robot controller (not shown) of the industrial robot 1. A first output shaft 61 of the first motor 6 and a second output shaft 71 of the second motor 7 are disposed parallel to each other, and protrude forward of the first wrist element 51. The first output shaft 61 and the second output shaft 71 are also parallel to the first axial line J1 and the third axial line J3.

As shown in FIGS. 1A, 1B, and 2, a position of the first motor 6 and a position of the second motor 7 deviate in a front-rear direction from each other inside the rear casing 510B. The second motor 7 is disposed forward from the first motor 6. Specifically, the first motor 6 is disposed closer to a rear end of the first wrist element 51 relative to the second motor 7. The second motor 7 is disposed closer to the mating surface MS with the front casing 510A relative to the first motor 6. The second motor 7 is disposed forward from the first output shaft 61 of the first motor 6. The first output shaft 61 of the first motor 6 does not overlap the second output shaft 71 of the second motor 7.

Further, as shown in FIG. 2, a position of the first motor 6 and a position of the second motor 7 deviate in a lateral direction from each other inside the rear casing 510B. The first output shaft 61 of the first motor 6 and the second output shaft 71 of the second motor 7 are not disposed on the same axial line, and the second motor 7 is disposed to be laterally offset relative to the first motor 6. Specifically, the first motor 6 is disposed closer in the direction Z2 relative to the first axial line J1. The second motor 7 is disposed closer in the direction Z1 relative to the first axial line J1.

A main body 70 of the second motor 7 deviates in the direction Z1 from an axial line J6 of the first output shaft 61 of the first motor 6. However, when the first motor 6 and the second motor 7 are viewed in a direction along the first axial line J1, a main body 60 of the first motor 6 partially overlaps the main body 70 of the second motor 7. Thus, a section area of the first wrist element 51 orthogonal to the first axial line J1 is kept small.

Inside the rear casing 510B, a first pedestal 63 on which the first motor 6 is mounted and a second pedestal 73 on which the second motor 7 is mounted are integrally provided. The first output shaft 61 of the first motor 6 and the second output shaft 71 of the second motor 7 are mounted to the rear casing 510B through the first pedestal 63 and the second pedestal 73, respectively. Thus, the first motor 6 and the second motor 7 are fixed to the rear casing 510B. A structure will be further described below in which the first motor 6 and the second motor 7 are mounted on the first pedestal 63 and the second pedestal 73, respectively.

Inside the front casing 510A, a reducer 8 for reducing a rotation speed of the first motor 6 with a predetermined reduction ratio and a reducer 9 for reducing a rotation speed of the second motor 7 with a predetermined reduction ratio are provided. Each of the reducers 8 and 9 is configured with a hypoid gear set each having pinion gears 81 and 91 rotationally driven by the first motor 6 and the second motor 7, respectively, and each of ring gears 82 and 92 meshing with the pinion gears 81 and 91, respectively.

Figure 4:
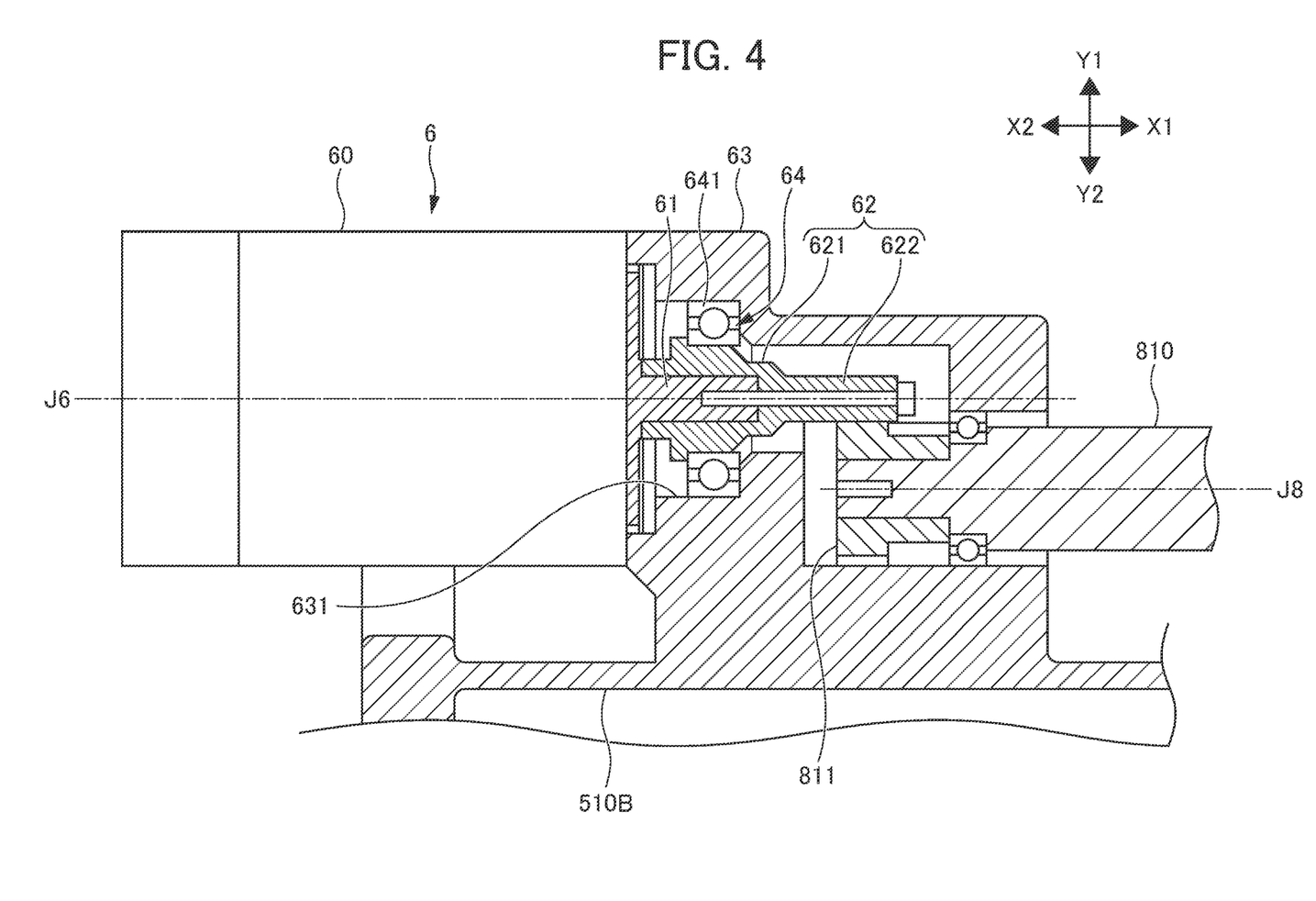
FIG. 4 is a sectional view taken along line (iv)-(iv) in FIG. 2.

The pinion gear 81 provided at a front end of a first drive shaft 810 extending long from the first motor 6 to the ring gear 82. The first drive shaft 810 is disposed parallel to the axial line J6 of the first output shaft 61 of the first motor 6. As shown in FIG. 2, the main body 70 of the second motor 7 is disposed in the lateral direction (direction Z1) in parallel with the first drive shaft 810. The first drive shaft 810 is provided so as to be rotatable around an axial line J8 extending in a longitudinal direction. The axial line J8 is disposed slightly below the axial line J6 of the first output shaft 61. A rear end of the first drive shaft 810 is disposed near the first output shaft 61. As shown in FIG. 4, a spur gear 811 is provided at the rear end of the first drive shaft 810. The spur gear 811 meshes with a first gear 62 mounted on the first output shaft 61 as will be described below.

Figure 5:
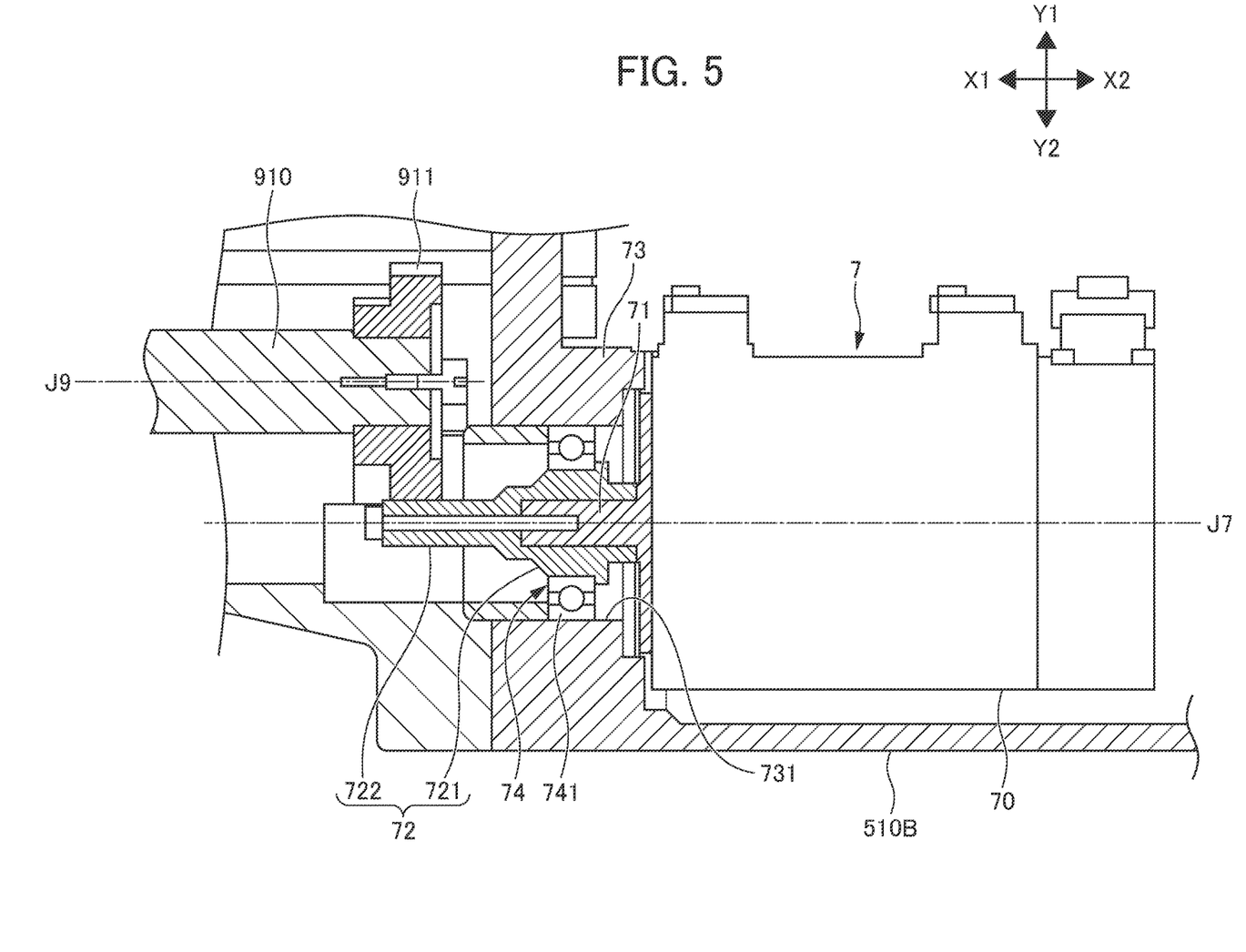
FIG. 5 is a sectional view taken along line (v)-(v) in FIG. 2.

The pinion gear 91 is provided at a front end of a second drive shaft 910 extending long from the second motor 7 to the ring gear 92. The second drive shaft 910 is disposed parallel to an axial line J7 of the second output shaft 71 of the second motor 7, and is provided so as to be rotatable around an axial line J9 extending in a longitudinal direction. The axial line J9 is disposed slightly above the axial line J7 of the second output shaft 71. A rear end of the second drive shaft 910 is disposed near the second output shaft 71. As shown in FIG. 5, a spur gear 911 is provided at the rear end of the second drive shaft 910. The spur gear 911 meshes with a second gear 72 mounted on the second output shaft 71 as will be described below.

Figure 3:
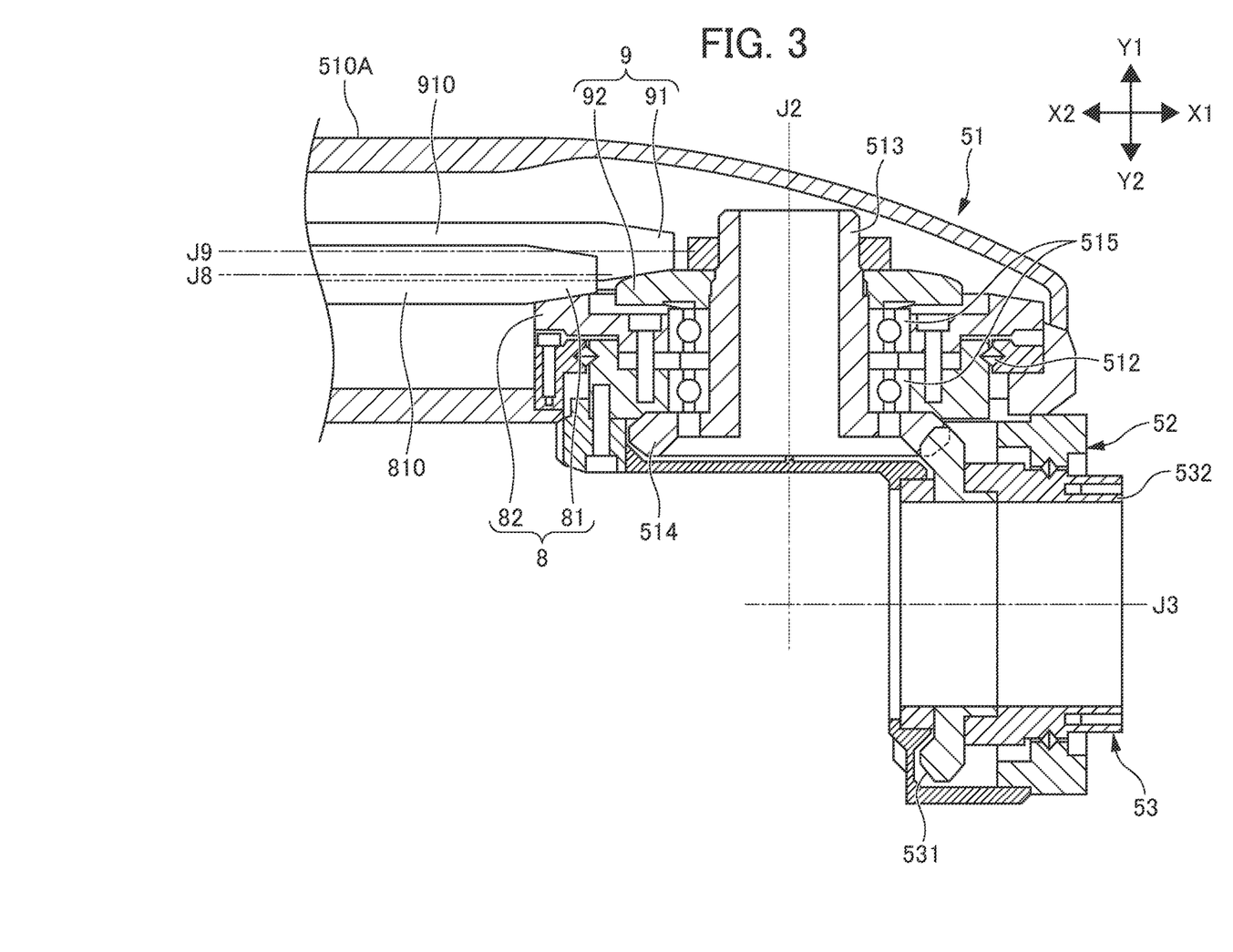
FIG. 3 is a sectional view showing a tip of the arm structure of the industrial robot.

As shown in FIGS. 2 and 3, at the front end of the front casing 510A, the ring gear 82 meshing with the pinion gear 81 and the ring gear 92 meshing with the pinion gear 91 are provided so as to be rotatable around the second axial line J2. The ring gear 821 has a larger diameter than the ring gear 92, and is disposed below the ring gear 92.

As shown in FIG. 3, the ring gear 82 is rotatably supported within the first wrist element 51 via a bearing 512. The ring gear 82 is coupled integrally to the second wrist element 52. Accordingly, the second wrist element 52 is rotatably driven around the second axial line J2 as the ring gear 82 rotates.

As shown in FIG. 3, the ring gear 92 is mounted on an outer circumference of a cylindrical body 513 disposed at the front end of the front casing 510A. The cylindrical body 513 is disposed coaxially with the second axial line J2 and extends downward from the ring gear 92. The cylindrical body 513 penetrates through the ring gear 82, and is rotatably supported on an inner circumference of the ring gear 82 via a bearing 515. A bevel gear 514 is integrally provided on the outer circumference of a lower end of the cylindrical body 513.

The third wrist element 53 has a cylindrical shape formed coaxially with the third axial line J3. A bevel gear 531 is integrally provided on the outer circumference of a rear end of the third wrist element 53. The bevel gear 531 meshes with the bevel gear 514. Therefore, when the bevel gear 514 rotates around the second axial line J2 due to the rotation of the ring gear 92, the bevel gear 531 rotates. Thus, the third wrist element 53 is rotatably driven around the third axial line J3.

A mounting surface 532 is formed at a front end of the third wrist element 53. An attachment (not shown) is detachably mounted on the mounting surface 532 depending on task contents of the industrial robot 1. The attachment is, for example, a robot hand or a welding torch.

As shown in FIG. 2, spaces SP1 and SP2 are formed behind the first motor 6 and the second motor 7, respectively, at the inside of the rear casing 510B. The space SP1 is disposed between a rear end surface 60a of the main body 60 of the first motor 6 and an inner rear end surface 51a of the rear casing 510B. The space SP2 is disposed behind a rear end surface 70a of the main body 70 of the second motor 7 and on the lateral side in the direction Z1 of the first pedestal 63.

The spaces SP1 and SP2 are large enough to allow motors having a size extending further rearward relative to the first motor 6 and the second motor 7 to be mounted inside the rear casing 510B instead of the first motor 6 and the second motor 7. For this reason, the spaces SP1 and SP2 can be used as a task space and a mounting space during replacement of the motors for driving the second wrist element 52 and the third wrist element 53 with motors that are longer along the axial lines J6 and J7 than the first motor 6 and the second motor 7 and have high torque.

As shown in FIG. 4, the first output shaft 61 of the first motor 6 is mounted with the first gear 62 that meshes with the spur gear 811 provided at the rear end of the first drive shaft 810. The first gear 62 is fitted to the outer circumference of the first output shaft 61, and thus includes integrally a base 621 mounted on the first output shaft 61 and a gear portion 622 extending forward of the first motor 6 along the axial line J6 from the base 621. The gear portion 622 has an outer diameter equivalent to the outer diameter of the first output shaft 61, and is formed with teeth meshing with the spur gear 811 of the first drive shaft 810 on an outer circumference thereof. The outer diameter of the gear portion 622 is a circular diameter whose outer circumference is a teeth tip of the gear portion 622.

The first motor 6 is mounted to the first pedestal 63 by the base 621 of the first gear 62. Specifically, the first pedestal 63 includes a mounting hole 631 that opens toward a rear of the first wrist element 51 and into which the first output shaft 61 is inserted. An external support bearing 64 is mounted on the outer circumference of the base 621 of the first gear 62. The first gear 62 and the external support bearing 64 mounted on the first out shaft 61 are inserted into the mounting hole 631 from the rear side of the first pedestal 63. An outer ring 641 of the external support bearing 64 is fitted into an inner circumference surface of the mounting hole 631 to perform positioning of the first output shaft 61. Thus, the first motor 6 as rotatably supported on the first pedestal 63 such that the first output shaft 61 and the first gear 62 are coaxial. The first gear 62 supported by the mounting hole 631 protrudes forward from the mounting hole 631, and meshes with the spur gear 811 provided at the rear end of the first drive shaft 810.

As shown in FIG. 5, the second output shaft 71 of the second motor 7 is mounted with the second gear 72 meshing with the spur gear 911 provided at the rear end of the second drive shaft 910. The second gear 72 integrally includes a base 721 mounted by being fitted to the outer circumference of the second output shaft 71 and a gear portion 722 extending forward of the second motor 7 along the axial line J7 from the base 721. The spur gear 911 meshes with the gear portion 722. The gear portion 722 has an outer diameter equivalent to the outer diameter of the second output shaft 71, and is formed with teeth meshing with the spur gear 911 of the second drive shaft 910 on an outer circumference thereof. The outer diameter of the gear portion 722 is a circular diameter whose outer circumference is a teeth tip of the gear portion 722.

The second motor 7 is mounted to the second pedestal 73 by the base 721 of the second gear 72. Specifically, the second pedestal 73 includes a mounting hole 731 that opens toward a rear of the first wrist element 51 and into which the second output shaft 71 is inserted. An external support bearing 74 is mounted on the outer circumference of the base 721 of the second gear 72. The second gear 72 and the external support bearing 74 mounted on the second output shaft 71 are inserted into the mounting hole 731 from the rear side of the second pedestal 73. An outer ring 741 of the external support bearing 74 is fitted into an inner circumference surface of the mounting hole 731 to perform positioning of the second output shaft 71. Thus, the second motor 7 is rotatably supported on the second pedestal 73 such that the second output shaft 71 and the second gear 72 are coaxial. The second gear 72 supported by the mounting hole 731 protrudes forward from the mounting hole 731, and meshes with the spur gear 911 provided at the rear end of the second drive shaft 910.

Note that the fact that the outer diameter of the first output shaft 61 is equivalent to the outer diameter of the gear portion 622 of the first gear 62 and that the outer diameter of the second output shaft 71 is equivalent to the outer diameter of the gear portion 722 of the second gear 72 means that the both outer diameters are substantially the same without being limited to a case where the both outer diameters are completely the same. If the first gear 62 and the second gear 72 can be detached through the mounting holes 631 and 731, respectively, during the replacement of the first motor 6 and the second motor 7, both the outer diameters may be slightly different from each other due to a manufacturing error.

As described above, the first gear 62 mounted on the first output shaft 61 of the first motor 6 has the outer diameter equivalent to the outer diameter of the first output shaft 61, and the second gear 72 mounted on the second output shaft 71 of the second motor 7 has the outer diameter equivalent to the outer diameter of the second output shaft 71. Further, the spaces SP1 and SP2 are provided behind the first motor 6 and the second motor 7, respectively. With these configurations, when an operator removes the first motor 6 and the second motor 7 for replacement, the first motor 6 and the second motor 7 can be easily removed from the first pedestal 63 and the second pedestal 73 in a following manner.

During removal of the first motor 6, the operator pulls the first motor 6 straight rearward toward the space SP1, and removes the external support bearing 64 from the mounting hole 631 of the first pedestal 63. Thus, the meshing between the first gear 62 and the spur gear 811 is released. Thereafter, the operator lifts the rear end of the first motor 6 upward and pulls it further rearward while tilting it, thereby pulling out the first output shaft 61 and the first gear 62 rearward from the mounting hole 631. Since the first gear 62 has the outer diameter equivalent to the outer diameter of the first output shaft 61, it can be easily removed from the mounting hole 631 by tilting the first motor 6. An inner diameter of the mounting hole 631 can also be minimized. Therefore, the first pedestal 63 can be made compact, and the first wrist element 51 can also be made compact.

During the removal of the second motor 7, it can also be easily removed from the second pedestal 73 in the same manner as the first motor 6. Further, in a case of changing to an arm structure having a larger payload capacity by replacing the first motor 6 and the second motor 7 and attaching a long motor with high torque than the first motor 6 and the second motor 7, the above operations are reversely performed. Since the spaces SP1 and SP2 are provided behind the first motor 6 and the second motor 7, respectively, the motor longer than the first motor 6 and the second motor 7 can be easily attached inside the rear casing 510B. Thus, the industrial robot 1 can change characteristics of the drive units of the second wrist element 52 and the third wrist element 53 to characteristics of a large payload capacity only by replacing the motors without replacing the wrist elements. Therefore, the industrial robot 1 can realize variation models with different drive unit characteristics using the same wrist element.

The first gear 62 and the second gear 72 are small-diameter gears each having outer diameters equivalent to the outer diameters of the first output shaft 61 and the second output shaft 71. Therefore, when the first motor 6 and the second motor generate maximum torque, a large repulsive force is generated on tooth flanks. However, the first gear 62 and the second gear 72 are supported by the mounting holes 631 and 731 of the first pedestal 63 and the second pedestal 73 by the external support bearings 64 and 74 mounted on the outer circumferences of the bases 621 and 721, respectively. For this reason, the first gear 62 and the second gear 72 can stably transmit rotational torque of the first output shaft 61 and the second output shaft 71 to the spur gears 811 and 911, respectively.

Further, the first motor 6 and the second motor 7 are supported by the first output shaft 61 and the second output shaft 71 by fitting of the outer rings 641 and 741 of the external support bearings 64 and 74 mounted on the outer circumferences of the bases 621 and 721 of the first gear 62 and the second gear 72 into the mounting holes 631 and 731. Therefore, it is easy to ensure the mounting accuracy of the first motor 6 and the second motor 7 with respect to the first pedestal 63 and the second pedestal 73. Since the hole diameters of the mounting holes 631 and 731 of the first pedestal 63 and the second pedestal 73 can be small, the first pedestal 63 and the second pedestal 73 can also be made compact.

Further, the gear portion 622 of the first gear 62 protrudes forward from the external support bearing 64, and meshes with the spur gear 811 of the first drive shaft 810, and the gear portion 722 of the second gear 72 protrudes forward from the external support bearing 74 and meshes with the spur gear 911 of the second drive shaft 910. Therefore, a meshing portion between the first gear 62 and the spur gear 811 and a meshing portion between the second gear 72 and the spur gear 911 are disposed to be in close proximity to the fitting portion between the external support bearings 64 and 74 and the mounting holes 631 and 731, respectively. Thus, the driving force of the first motor 6 and the second motor 7 can be stably transmitted to the first drive shaft 810 and the second drive shaft 910. Further, it is also easy to ensure positional accuracy of the spur gears 811 and 911 with respect to the first gear 62 and the second gear 72.

In addition, since the first gear 62 and the second gear 72 have small diameters, the meshing portion between the first gear 62 and the spur gear 811 and the meshing portion between the second gear 72 and the spur gear 911 can be increased in reduction ratio. For this reason, the industrial robot 1 also has the effect of being able to easily cope with an increase in the payload capacity.

In the above-described embodiment, the second motor 7 is disposed on the front side of the first wrist element 51 relative to the first motor 6, but is not limited thereto. The first motor 6 may be disposed on the front side of the first wrist element 51 relative to the second motor 7.

In the above-described embodiment, the housing 510 of the first wrist element 51 is divided into the front casing 510A and the rear casing 510B via the mating surface MS vertical to the first axial line J1, but the configuration of the housing 510 is not limited as long as the first motor 6 and the second motor 7 can be offset from each other.

In the above-described embodiment, the rear ends of the first drive shaft 810 and the second drive shaft 910 are configured such that the driving forces are transmitted from the first gear 62 and the second gear 72 only by the spur gears 811 and 911, respectively. However, gears may be further added in addition to the spur gears 811 and 911 so as to adjust the reduction ratio between first gear 62 and the second gear 72 and the first drive shaft 810 and the second drive shaft 910.

EXPLANATION OF REFERENCE NUMERALS 1 industrial robot
51 first wrist element
52 second wrist element
53 third wrist element
510 housing
6 first motor
61 first output shaft
62 first gear
7 second motor
71 second output shaft
72 second gear
63 first pedestal
631 mounting hole
64 external support hearing
641 outer ring
73 second pedestal
731 mounting hole
74 external support bearing
741 outer ring
810 first drive shaft
811 spur gear
910 second drive shaft
911 spur gear
J6, J7 axial line
SP1, SP2 space

The invention claimed is:

1. An arm structure of an industrial robot including a plurality of wrist elements, comprising:
    a first motor and a second motor that drive the plurality of wrist elements, respectively, within a housing;
    a first gear that is mounted on a first output shaft of the first motor;
    a second gear that is mounted on a second output shaft of the second motor,
    a first pedestal having a mounting hole into which the first output shaft and the first gear is inserted;
    a second pedestal having a mounting hole into which the second output shaft and the second gear is inserted,
    a first drive shaft that transmits a driving force of the first motor to a first wrist element of the plurality of wrist elements and includes a gear at a rear end thereof and a gear at a front end thereof which meshes directly with a gear of the first wrist element, and
    a second drive shaft that transmits a driving force of the second motor to a second wrist element of the plurality of wrist elements and includes a gear at a rear end thereof and a gear at a front end thereof which meshes directly with a gear of the second wrist element,
wherein
    the second motor is disposed forward from the first motor, and is disposed such that an axial line of the second output shaft is laterally offset with respect to an axial line of the first output shaft,
    the first drive shaft is laterally positioned on the axial line of the first output shaft, and the second drive shaft is laterally positioned on an axial line of the second output shaft in a plan view of the arm structure,
    the axial directions of the first output shaft, the second output shaft, the first drive shaft, and the second drive shaft are in parallel with one another, spaces are provided behind the first motor and the second motor, respectively, the first gear includes a base fitted to an outer circumference of the first output shaft and a toothed portion extending forward of the first motor from the base, the second gear includes a base fitted to an outer circumference of the second output shaft and a toothed portion extending forward of the second motor from the base, external support bearings are respectively mounted on the outer circumference of the base of the first gear and the outer circumference of the base of the second gear, an outer ring of each of the external support bearings is fitted to an inner circumference of the mounting hole of the first pedestal and an inner circumference of the mounting hole of the second pedestal, such that the first motor and the second motor are positioned on the first pedestal and the second pedestal, respectively, in a state in which the first output shaft and the first gear of the first motor and the second output shaft and the second gear of the second motor are coaxially supported by the external support bearings, respectively, the toothed portion of the first gear has an outer diameter equivalent to that of the first output shaft, and the toothed portion of the second gear has an outer diameter equivalent to that of the second output shaft.

2. The arm structure of an industrial robot according to claim 1, wherein the toothed portion of the first gear protrudes forward from the external support bearing and meshes with the gear of the first drive shaft, and the toothed portion of the second gear protrudes forward from the external support bearing and meshes with the gear of the second drive shaft.

* * * * *